(12) United States Patent
Dutta et al.

(10) Patent No.: US 12,377,388 B2
(45) Date of Patent: Aug. 5, 2025

(54) ACOUSTIC COMPOSITE INCLUDING A STIFFENING POLYMER, DEVICES, AND ASSEMBLIES INCLUDING THE SAME

(71) Applicant: W. L. Gore & Associates, Inc., Newark, DE (US)

(72) Inventors: Anit Dutta, Wilmington, DE (US); Ryan Kenaley, Hockessin, DE (US); Lindsey Notigan, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 581 days.

(21) Appl. No.: 17/765,335

(22) PCT Filed: Oct. 14, 2019

(86) PCT No.: PCT/US2019/056122
§ 371 (c)(1),
(2) Date: Mar. 30, 2022

(87) PCT Pub. No.: WO2021/076096
PCT Pub. Date: Apr. 22, 2021

(65) Prior Publication Data
US 2022/0410082 A1 Dec. 29, 2022

(51) Int. Cl.
*H04R 1/44* (2006.01)
*B01D 67/00* (2006.01)
(Continued)

(52) U.S. Cl.
CPC ....... *B01D 69/125* (2013.01); *B01D 67/0025* (2013.01); *B01D 67/0088* (2013.01);
(Continued)

(58) Field of Classification Search
CPC .................................. H04R 1/44; H04R 7/00
See application file for complete search history.

(56) References Cited

U.S. PATENT DOCUMENTS

| 4,187,390 A | 2/1980 | Gore |
| 5,258,746 A | 11/1993 | Leitten et al. |

(Continued)

FOREIGN PATENT DOCUMENTS

| CA | 2155328 A1 | 9/1994 |
| CN | 103974166 A | 8/2014 |

(Continued)

OTHER PUBLICATIONS

International Preliminary Report on Patentability received for PCT Patent Application No. PCT/US19/056122, mailed on Apr. 28, 2022, 9 pages.

(Continued)

*Primary Examiner* — Suhan Ni
(74) *Attorney, Agent, or Firm* — Faegre Drinker Biddle & Reath LLP (57) ABSTRACT

A composite that includes an expanded polytetrafluoroethylene (ePTFE) membrane having a porous microstructure. The porous microstructure of the ePTFE membrane is impregnated with a stiffening polymer. An acoustic device assembly that includes the composite and an acoustic device is also described. The composite and the acoustic device assembly can exhibit an insertion loss of less than 7 dB at 1 kHz when measured by the Acoustic Response Measurement ("ARM") Test.

16 Claims, 5 Drawing Sheets

(51) Int. Cl.
  *B01D 69/02* (2006.01)
  *B01D 69/10* (2006.01)
  *B01D 69/12* (2006.01)
  *B01D 71/36* (2006.01)
  *H04R 1/08* (2006.01)
  *H04R 7/00* (2006.01)

(52) U.S. Cl.
  CPC ........... *B01D 69/02* (2013.01); *B01D 69/107* (2022.08); *B01D 71/36* (2013.01); *H04R 1/44* (2013.01); *H04R 7/00* (2013.01); *B01D 2323/46* (2013.01); *B01D 2325/04* (2013.01); *B01D 2325/24* (2013.01)

(56) References Cited

U.S. PATENT DOCUMENTS

| | | | |
|---|---|---|---|
| 5,429,869 | A | 7/1995 | McGregor et al. |
| 5,500,038 | A | 3/1996 | Dauber et al. |
| 6,512,834 | B1 | 1/2003 | Banter et al. |
| 6,737,158 | B1 | 5/2004 | Thompson |
| 7,306,729 | B2 | 12/2007 | Bacino et al. |
| 7,751,579 | B2 | 7/2010 | Schulein et al. |
| 8,739,926 | B1 | 6/2014 | Mori |
| 9,253,297 | B2 | 2/2016 | Abe et al. |
| 2003/0035898 | A1 | 2/2003 | Sanguineti et al. |
| 2003/0054155 | A1 | 3/2003 | Nomi et al. |
| 2004/0084304 | A1 | 5/2004 | Thompson |
| 2005/0077102 | A1 | 4/2005 | Banter et al. |
| 2006/0269735 | A1 | 11/2006 | Wang et al. |
| 2007/0122607 | A1 | 5/2007 | Hisano |
| 2008/0009211 | A1 | 1/2008 | Himes et al. |
| 2008/0026190 | A1 | 1/2008 | King et al. |
| 2008/0125710 | A1 | 5/2008 | Hobson et al. |
| 2008/0243001 | A1 | 10/2008 | Oakley et al. |
| 2009/0268928 | A1 | 10/2009 | Ikeyama et al. |
| 2010/0206660 | A1 | 8/2010 | Horie et al. |
| 2010/0247857 | A1 | 9/2010 | Sanami et al. |
| 2011/0186381 | A1 | 8/2011 | Ogawa et al. |
| 2011/0209265 | A1 | 9/2011 | Komada et al. |
| 2011/0255728 | A1 | 10/2011 | Abe et al. |
| 2013/0188801 | A1 | 7/2013 | Ambrose et al. |
| 2014/0048351 | A1 | 2/2014 | Banter |
| 2014/0083296 | A1 | 3/2014 | Sanders |
| 2015/0146905 | A1 | 5/2015 | Abe et al. |
| 2015/0165386 | A1 | 6/2015 | Mori et al. |
| 2015/0238909 | A1 | 8/2015 | Mori et al. |
| 2015/0304750 | A1 | 10/2015 | Mori |
| 2016/0249119 | A1 | 8/2016 | Mori et al. |
| 2016/0337737 | A1 | 11/2016 | Kato et al. |
| 2017/0006365 | A1 | 1/2017 | Mori et al. |
| 2017/0006369 | A1 | 1/2017 | Kenaley et al. |

FOREIGN PATENT DOCUMENTS

| | | |
|---|---|---|
| CN | 106671541 A | 5/2017 |
| EP | 0740264 A2 | 10/1996 |
| JP | 2005-101889 A | 4/2005 |
| JP | 2017-071131 A | 4/2017 |
| JP | 2018-524895 A | 8/2018 |
| WO | 2009/153991 A1 | 12/2009 |
| WO | 2018/020987 A1 | 2/2018 |

OTHER PUBLICATIONS

International Search Report and Written Opinion received for PCT Patent Application No. PCT/US19/056122, mailed on Jul. 15, 2020, 11 pages.

Seggern, et al., "Highly Efficient Piezoelectrets through Ultra-Soft Elastomeric Spacers," Polymers, vol. 13, No. 21, Oct. 29, 2021, pp. 1-14.

Zhang, et al., "Audio and ultrasonic responses of laminated fluoroethylenepropylene and porous polytetrafluoroethylene films with different charge distributions," Journal of Physics D Applied Physics, vol. 49, No. 20, May 2016, pp. 4.

ACOUSTIC COMPOSITE INCLUDING A STIFFENING POLYMER, DEVICES, AND ASSEMBLIES INCLUDING THE SAME

CROSS-REFERENCE TO RELATED APPLICATION

This application is a national phase application of PCT Application No. PCT/US2019/056122, internationally filed on Oct. 14, 2019, which is herein incorporated by reference in its entirety for all purposes.

FIELD

The present disclosure relates to the field of acoustic composites, devices, and assemblies including the same.

BACKGROUND

Acoustic device covers (e.g., microphone covers) protect acoustic devices against external stresses such as water pressure while concurrently minimizing acoustic losses. There is an ongoing need in the art for acoustic device covers that can perform these functions.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Some embodiments of the present disclosure relate to a composite comprising: an expanded polytetrafluoroethylene (ePTFE) membrane having a porous microstructure; wherein the porous microstructure of the ePTFE membrane is fully impregnated with a stiffening polymer such that an average air flow of the composite is 0.0 liters/hour/cm$^2$ at 1.0 psi measured according to the Laminar Volumetric Airflow ("LVA") Test; wherein the stiffening polymer is a polymer that, when filling the porous microstructure of the ePTFE membrane in an amount ranging from 40 wt % to 85 wt % based on the total weight of the composite, increases the average stiffness of the composite by at least 20% compared to an average stiffness of the ePTFE membrane before impregnation with the stiffening polymer; and wherein the composite exhibits an insertion loss of less than 7 dB at 1 kHz when measured by the Acoustic Response Measurement ("ARM") Test. The composite has a thickness of 10 microns or less.

In some embodiments, the composite exhibits a burst strength of greater than 125 psi.

In some embodiments, the stiffening polymer comprises at least one of: tetrafluoroethylene-hexafluoropropylene-vinylidene fluoride copolymer, polycaprolactone, thermoplastic polyimide, thermoplastic polyurethanes, polysulfones, polyethersulfones, polystyrene, polyvinylidene fluoride, polycarbonates, polymethylmethacrylate, polyarylates, polybenzimidazoles, polyimides, epoxies, acrylates, or any combination thereof.

In some embodiments, the stiffening polymer comprises at least one of: tetrafluoroethylene-hexafluoropropylene-vinylidene fluoride copolymer, polycaprolactone, thermoplastic polyurethanes, or any combination thereof.

In some embodiments, the stiffening polymer does not comprise: styrene-butadiene-styrene block copolymers, styrene-isoprene-styrene block copolymers, tetrafluoroethylene/perfluoromethyl vinyl ether copolymers, silicone rubbers, styrenic block copolymers, thermoplastic copolyesters, and thermoplastic copolyamides, polyetherimides, silicones, fluorosilicones, fluoroelastomers, perfluoroelastomers, styrene-butadiene rubbers, ethylene diene propylene (EPDM) rubbers, nitrile rubbers, neoprene rubbers, or any combination thereof.

In some embodiments, the composite is predominantly acoustically reactive, such that the phase angle ("$\varphi$") between a real and an imaginary part of an acoustic impedance satisfies the following relations:

$$45° < \varphi \leq 90°; \text{ and} \quad (I)$$

$$-90° \leq \varphi < -45°. \quad (II)$$

In some embodiments, the composite exhibits a decrease in displacement of from 5% to 50% compared to the ePTFE membrane before impregnation with the stiffening polymer, wherein the decrease in displacement is measured using the biaxial, out of plane displacement ("BOD") Test.

Some embodiments of the present disclosure relate to an acoustic device assembly comprising: an acoustic device; and a composite; wherein the composite comprises: an expanded polytetrafluoroethylene (ePTFE) membrane having a porous microstructure; wherein the porous microstructure of the ePTFE membrane is impregnated with a stiffening polymer such that an average air flow of the composite is 0.0 liters/hour/cm$^2$ at 1.0 psi measured according to the Laminar Volumetric Airflow ("LVA") Test; wherein the stiffening polymer is a polymer that, when impregnated in the porous microstructure of the ePTFE membrane in an amount ranging from 40 wt % to 85 wt % based on the total weight of the composite, increases the average stiffness of the composite by at least 20% compared to an average stiffness of the ePTFE membrane before impregnation with the stiffening polymer; and wherein the acoustic device assembly exhibits an insertion loss of less than 7 dB at 1 kHz when measured by the Acoustic Response Measurement ("ARM") Test.

In some embodiments, the acoustic device is a speaker.

In some embodiments, the acoustic device is a receiver.

In some embodiments, the acoustic device comprises an acoustic cavity and a transducer.

In some embodiments, the transducer is disposed within the acoustic cavity.

In some embodiments, the composite is disposed over the acoustic cavity.

In some embodiments, the acoustic device includes a housing, wherein the housing comprises an acoustic channel aligned with the acoustic cavity of the acoustic device.

In some embodiments there is an adhesive layer between the composite and the housing.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

All prior patents, publications, and test methods referenced herein are incorporated by reference in their entireties.

Some embodiments of the present disclosure are directed to a composite. As used herein, the term "composite" refers to a material made from two or more constituent materials with different physical or chemical properties that, when combined, produce a material with characteristics different from the individual components.

In some embodiments, the composite comprises an expanded polytetrafluoroethylene (ePTFE) membrane having a porous microstructure that is impregnated with a polymer. As used herein, the term "impregnated" means that at least a portion of the porous microstructure of the ePTFE membrane is filled with the polymer. In some embodiments, the porous microstructure of the ePTFE membrane can include a plurality of nodes connected by a plurality of fibrils, such that the plurality of nodes and the plurality of fibrils are impregnated with the polymer. In some embodiments, the polymer is impregnated into the ePTFE membrane so as to form a continuous layer across a cross-section of the ePTFE membrane. In some embodiments, the continuous layer across the cross-section of the ePTFE membrane can act as a barrier to airflow.

In some embodiments, the porous microstructure of the ePTFE membrane is fully impregnated with the polymer. As used herein the term "fully impregnated" means that the entire porous microstructure of the ePTFE membrane is completely filled with the polymer, such that the resulting composite exhibits an average air flow of 0.0 liters/hour/cm$^2$ at 1.0 psi measured using the Laminar Volumetric Airflow ("LVA") Test. The method for performing the LVA Test, is set forth herein in the "Test Methods" section.

In some embodiments, the porous microstructure of the ePTFE membrane is impregnated or fully impregnated with a stiffening polymer. As used herein, a "stiffening polymer" is a polymer that, when impregnated in the porous microstructure of the ePTFE membrane in a sufficient amount, increases the average stiffness of the composite by at least 20% compared to an average stiffness of the ePTFE membrane before impregnation with the stiffening polymer.

In some embodiments, the sufficient amount of the polymer ranges from 40 wt % to 85 wt % of the total weight of the composite. In some embodiments, the sufficient amount of the polymer ranges from 50 wt % to 85 wt % of the total weight of the composite. In some embodiments, the sufficient amount of the polymer ranges from 60 wt % to 85 wt % of on the total weight of the composite. In some embodiments, the sufficient amount of the polymer ranges from 70 wt % to 85 wt % of the total weight of the composite. In some embodiments, the sufficient amount of the polymer ranges from 80 wt % to 85 wt % of the total weight of the composite.

In some embodiments, the sufficient amount of the polymer ranges from 40 wt % to 75 wt % of the total weight of the composite. In some embodiments, the sufficient amount of the polymer ranges from 40 wt % to 65 wt % of the total weight of the composite. In some embodiments, the sufficient amount of the polymer ranges from 40 wt % to 55 wt % of the total weight of the composite. In some embodiments, the sufficient amount of the polymer ranges from 40 wt % to 50 wt % of the total weight of the composite. In some embodiments, the sufficient amount of the polymer ranges from 40 wt % to 45 wt % of the total weight of the composite.

In some embodiments, the sufficient amount of the polymer ranges from 50 wt % to 80 wt % of the polymer based on the total weight of the composite. In some embodiments, the sufficient amount of the polymer ranges from 50 wt % to 75 wt % of the total weight of the composite. In some embodiments, the sufficient amount of the polymer ranges from 50 wt % to 70 wt % of the total weight of the composite. In some embodiments, the sufficient amount of the polymer ranges from 50 wt % to 65 wt % of the total weight of the composite. In some embodiments, the sufficient amount of the polymer ranges from 50 wt % to 60 wt % of the total weight of the composite. In some embodiments, the sufficient amount of the polymer ranges from 50 wt % to 55 wt % of the total weight of the composite.

In some embodiments, the sufficient amount of the polymer ranges from 55 wt % to 80 wt % of the total weight of the composite. In some embodiments, the sufficient amount of the polymer ranges from 55 wt % to 75 wt % of the total weight of the composite. In some embodiments, the sufficient amount of the polymer ranges from 55 wt % to 70 wt % of the total weight of the composite. In some embodiments, the sufficient amount of the polymer ranges from 55 wt % to 60 wt % of the total weight of the composite.

In some embodiments, the sufficient amount of the polymer ranges from 60 wt % to 80 wt % of the total weight of the composite. In some embodiments, the sufficient amount of the polymer ranges from 60 wt % to 75 wt % of the total weight of the composite. In some embodiments, the sufficient amount of the polymer ranges from 60 wt % to 70 wt % of the total weight of the composite. In some embodiments, the sufficient amount of the polymer ranges from 60 wt % to 65 wt % of the total weight of the composite.

In some embodiments, the sufficient amount of the polymer ranges from 65 wt % to 70 wt % of the total weight of the composite.

In some embodiments, whether a polymer is a "stiffening polymer" is determined by using a "test ePTFE membrane" and a "test composite." In such embodiments, the test ePTFE membrane and the test composite have the same characteristics as the ePTFE membrane used in the composite of the present disclosure. Specifically, the test ePTFE membrane is an ePTFE membrane having a porous microstructure and the test composite is the test ePTFE membrane impregnated with a polymer in the sufficient amount described herein based on the total weight of the composite. The "test ePTFE membrane" and "the test composite" are used for the sole purpose of determining if a particular polymer is a stiffening polymer. If the impregnation of the polymer in the test ePTFE membrane in the sufficient amount increases the average stiffness of the test composite to a value that is at least 20% greater than that of the test ePTFE membrane, then the polymer is a stiffening polymer. If the impregnation of the polymer in the test ePTFE membrane in the sufficient amount does not increase the average stiffness of the test composite to a value that is at least 20% greater than that of the test ePTFE membrane, then the polymer is not a stiffening polymer.

In some embodiments, when impregnated within the ePTFE membrane in the sufficient amount defined herein, the stiffening polymer increases the average stiffness of the composite by at least 30% compared to an average stiffness of the ePTFE membrane before impregnation with the stiffening polymer. In some embodiments, when impregnated within the ePTFE membrane in the sufficient amount defined herein, the stiffening polymer increases the average stiffness of the composite by at least 40% compared to an average stiffness of the ePTFE membrane before impregnation with the stiffening polymer. In some embodiments, when impregnated within the ePTFE membrane in the sufficient amount defined herein, the stiffening polymer increases the average stiffness of the composite by at least 50% compared to an average stiffness of the ePTFE membrane before impregnation with the stiffening polymer. In some embodiments, when impregnated within the ePTFE membrane in the sufficient amount defined herein, the stiffening polymer increases the average stiffness of the composite by at least 60% compared to an average stiffness of the ePTFE membrane before impregnation with the stiffening polymer. In some embodiments, when impregnated within the ePTFE membrane in the sufficient amount defined herein, the stiffening polymer increases the average stiffness of the composite by at least 70% compared to an average stiffness of the ePTFE membrane before impregnation with the stiffening polymer. In some embodiments, when impregnated within the ePTFE membrane in the sufficient amount defined herein, the stiffening polymer increases the average stiffness of the composite by at least 80% compared to an average stiffness of the ePTFE membrane before impregnation with the stiffening polymer. In some embodiments, when impregnated within the ePTFE membrane in the sufficient amount defined herein, the stiffening polymer increases the average stiffness of the composite by at least 90% compared to an average stiffness of the ePTFE membrane before impregnation with the stiffening polymer. In some embodiments, when impregnated within the ePTFE membrane in the sufficient amount defined herein, the stiffening polymer increases the average stiffness of the composite by at least 100% compared to an average stiffness of the ePTFE membrane before impregnation with the stiffening polymer.

In some embodiments, the stiffening polymer comprises at least one of: tetrafluoroethylene-hexafluoropropylene-vinylidene fluoride copolymer, polycaprolactone, thermoplastic polyurethanes, thermoplastic polyimide, polysulfones, polyethersulfones, polystyrene, polyvinylidene fluoride, polycarbonates, polymethylmethacrylate, polyarylates, polybenzimidazoles, polyimides, epoxies, acrylates, or any combination thereof.

In some embodiments, the stiffening polymer is selected from the group consisting of: tetrafluoroethylene-hexafluoropropylene-vinylidene fluoride copolymer, polycaprolactone, thermoplastic polyurethanes, thermoplastic polyimide, polysulfones, polyethersulfones, polystyrene, polyvinylidene fluoride, polycarbonates, polymethylmethacrylate, polyarylates, polybenzimidazoles, polyimides, epoxies, acrylates, and any combination thereof.

In some embodiments, the stiffening polymer comprises at least one of: tetrafluoroethylene-hexafluoropropylene-vinylidene fluoride copolymer, polycaprolactone, thermoplastic polyurethanes, or any combination thereof.

In some embodiments, the stiffening polymer is selected from the group consisting of: tetrafluoroethylene-hexafluoropropylene-vinylidene fluoride copolymer, polycaprolactone, thermoplastic polyurethanes, and any combination thereof.

In some embodiments, the stiffening polymer does not comprise an elastomer. As defined herein an elastomer is a polymer that can reversibly extend, in at least one direction, from 5% to 700% relative to an initial length without permanent deformation.

In some embodiments, the stiffening polymer does not include: styrene-butadiene-styrene block copolymers, styrene-isoprene-styrene block copolymers, tetrafluoroethylene/perfluoromethyl vinyl ether copolymers, silicone rubbers, styrenic block copolymers, thermoplastic copolyesters, and thermoplastic copolyamides, polyetherimides, silicones, fluorosilicones, fluoroelastomers, perfluoroelastomers, styrene-butadiene rubbers, ethylene diene propylene (EPDM) rubbers, nitrile rubbers, neoprene rubbers, or any combination thereof.

In some embodiments, the composite exhibits an insertion loss of less than 7 dB at 1 kHz when measured by the Acoustic Response Measurement ("ARM") Test. As used herein, the term "insertion loss" refers to the loss in sound pressure level that results from placing ("inserting") the composite described herein in an acoustic pathway (e.g., a cavity or channel) between a speaker and a receiver. A non-limiting method for performing the ARM Test is set forth herein in the "Test Methods" section.

In some embodiments, the composite is predominantly acoustically reactive. As used herein, "predominantly acoustically reactive" means that a phase angle ("$\varphi$") between a real and an imaginary part of an acoustic impedance of the composite satisfies the following relations: $45° < \varphi \leq 90°$; and $-90° \leq \varphi < -45°$. As used herein, "acoustic impedance" is a measure of a material's opposition to acoustic propagation across the material. Acoustic impedance is a complex number having a real and an imaginary part. "Acoustic reactance" is measured by the imaginary part of acoustic impedance. "Acoustic resistance" corresponds to the real part of acoustic impedance. The phase angle between the real and imaginary parts of the complex number for acoustic impedance determines whether a material is predominantly resistive or reactive.

In some embodiments, the composite has a thickness of 10 microns or less. In some embodiments, the composite has a thickness of 9 microns or less. In some embodiments, the composite has a thickness of 8 microns or less. In some embodiments, the composite has a thickness of 7 microns or less. In some embodiments, the composite has a thickness of 6 microns or less. In some embodiments, the composite has a thickness of 5 microns or less. In some embodiments, the composite has a thickness of 4 microns or less. In some embodiments, the composite has a thickness of 3 microns or less. In some embodiments, the composite has a thickness of 2 microns or less. In some embodiments, the composite has a thickness of 1 micron or less.

In some embodiments, the composite has a thickness that ranges from 1 to 10 microns. In some embodiments, the composite has a thickness that ranges from 2 to 10 microns. In some embodiments, the composite has a thickness that ranges from 3 to 10 microns. In some embodiments, the composite has a thickness that ranges from 4 to 10 microns. In some embodiments, the composite has a thickness that ranges from 5 to 10 microns. In some embodiments, the composite has a thickness that ranges from 6 to 10 microns. In some embodiments, the composite has a thickness that ranges from 7 to 10 microns. In some embodiments, the composite has a thickness that ranges from 8 to 10 microns. In some embodiments, the composite has a thickness that ranges from 9 to 10 microns.

In some embodiments, the composite has a thickness that ranges from 1 to 2 microns. In some embodiments, the composite has a thickness that ranges from 1 to 3 microns. In some embodiments, the composite has a thickness that ranges from 1 to 4 microns. In some embodiments, the composite has a thickness that ranges from 1 to 5 microns. In some embodiments, the composite has a thickness that ranges from 1 to 6 microns. In some embodiments, the composite has a thickness that ranges from 1 to 7 microns. In some embodiments, the composite has a thickness that ranges from 1 to 8 microns. In some embodiments, the composite has a thickness that ranges from 1 to 9 microns.

In some embodiments, the composite exhibits a burst strength of greater than 120 psi. In some embodiments, the composite exhibits a burst strength of greater than 125 psi. In some embodiments, the composite exhibits a burst strength of greater than 130 psi. In some embodiments, the composite exhibits a burst strength of greater than 135 psi. In some embodiments, the composite exhibits a burst strength of greater than 140 psi. In some embodiments, the composite exhibits a burst strength of greater than 145 psi. In some embodiments, the composite exhibits a burst strength of greater than 150 psi. In some embodiments, the composite exhibits a burst strength of greater than 160 psi. In some embodiments, the composite exhibits a burst strength of greater than 170 psi. In some embodiments, the composite exhibits a burst strength of greater than 180 psi. In some embodiments, the composite exhibits a burst strength of greater than 190 psi. In some embodiments, the composite exhibits a burst strength of greater than 200 psi.

In some embodiments, the composite exhibits a burst strength described herein after a 10-minute hold time. As defined herein, "hold time" is the amount of time that the composite is maintained under pressure. In some embodiments, the composite exhibits a burst strength described herein after a 9-minute hold time. In some embodiments, the composite exhibits a burst strength described herein after an 8-minute hold time. In some embodiments, the composite exhibits a burst strength described herein after a 7-minute hold time. In some embodiments, the composite exhibits a burst strength described herein after a 6-minute hold time. In some embodiments, the composite exhibits a burst strength described herein after a 5-minute hold time. In some embodiments, the composite exhibits a burst strength described herein after a 4-minute hold time. In some embodiments, the composite exhibits a burst strength described herein after a 3-minute hold time. In some embodiments, the composite exhibits a burst strength described herein after a 2-minute hold time. In some embodiments, the composite exhibits a burst strength described herein after a 1-minute hold time.

In some embodiments, the composite exhibits a decrease in displacement of from 5% to 50% compared to the ePTFE membrane before impregnation with the stiffening polymer, wherein the decrease in displacement is measured using the biaxial, out of plane displacement ("BOD") Test. In some embodiments, the composite exhibits a decrease in displacement of from 5% to 40% compared to the ePTFE membrane before impregnation with the stiffening polymer, wherein the decrease in displacement is measured using the biaxial, out of plane displacement ("BOD") Test. In some embodiments, the composite exhibits a decrease in displacement of from 5% to 30% compared to the ePTFE membrane before impregnation with the stiffening polymer, wherein the decrease in displacement is measured using the biaxial, out of plane displacement ("BOD") Test. In some embodiments, the composite exhibits a decrease in displacement of from 5% to 20% compared to the ePTFE membrane before impregnation with the stiffening polymer, wherein the decrease in displacement is measured using the biaxial, out of plane displacement ("BOD") Test. In some embodiments, the composite exhibits a decrease in displacement of from 5% to 10% compared to the ePTFE membrane before impregnation with the stiffening polymer, wherein the decrease in displacement is measured using the biaxial, out of plane displacement ("BOD") Test.

In some embodiments, the composite exhibits a decrease in displacement of from 10% to 50% compared to the ePTFE membrane before impregnation with the stiffening polymer, wherein the decrease in displacement is measured using the biaxial, out of plane displacement ("BOD") Test. In some embodiments, the composite exhibits a decrease in displacement of from 20% to 50% compared to the ePTFE membrane before impregnation with the stiffening polymer, wherein the decrease in displacement is measured using the biaxial, out of plane displacement ("BOD") Test. In some embodiments, the composite exhibits a decrease in displacement of from 30% to 50% compared to the ePTFE membrane before impregnation with the stiffening polymer, wherein the decrease in displacement is measured using the biaxial, out of plane displacement ("BOD") Test. In some embodiments, the composite exhibits a decrease in displacement of from 40% to 50% compared to the ePTFE membrane before impregnation with the stiffening polymer, wherein the decrease in displacement is measured using the biaxial, out of plane displacement ("BOD") Test.

In some embodiments, the composite exhibits a decrease in displacement of from 10% to 40% compared to the ePTFE membrane before impregnation with the stiffening polymer, wherein the decrease in displacement is measured using the biaxial, out of plane displacement ("BOD") Test. In some embodiments, the composite exhibits a decrease in displacement of from 20% to 30% compared to the ePTFE membrane before impregnation with the stiffening polymer, wherein the decrease in displacement is measured using the biaxial, out of plane displacement ("BOD") Test.

In some embodiments, the composite is incorporated into an acoustic device assembly that includes an acoustic device. In some embodiments, the acoustic device is a speaker. In some embodiments, the acoustic device is a receiver.

In some embodiments, the acoustic device comprises an acoustic cavity and a transducer. In some embodiments, the transducer is disposed within the acoustic cavity. In some embodiments, the composite is disposed over the acoustic cavity.

In some embodiments, the acoustic device assembly includes a housing. In some embodiments, an adhesive layer is disposed between the composite and the housing. In some embodiments, the housing includes an acoustic channel aligned with the acoustic cavity of the acoustic device. In some embodiments, the acoustic device assembly includes an acoustic protective cover disposed over the acoustic device. In some embodiments, the acoustic protective cover comprises the composite. In some embodiments, the acoustic device assembly exhibits an insertion loss of less than 7 dB at 1 kHz when measured by the Acoustic Response Measurement ("ARM") Test.

Figure 1:
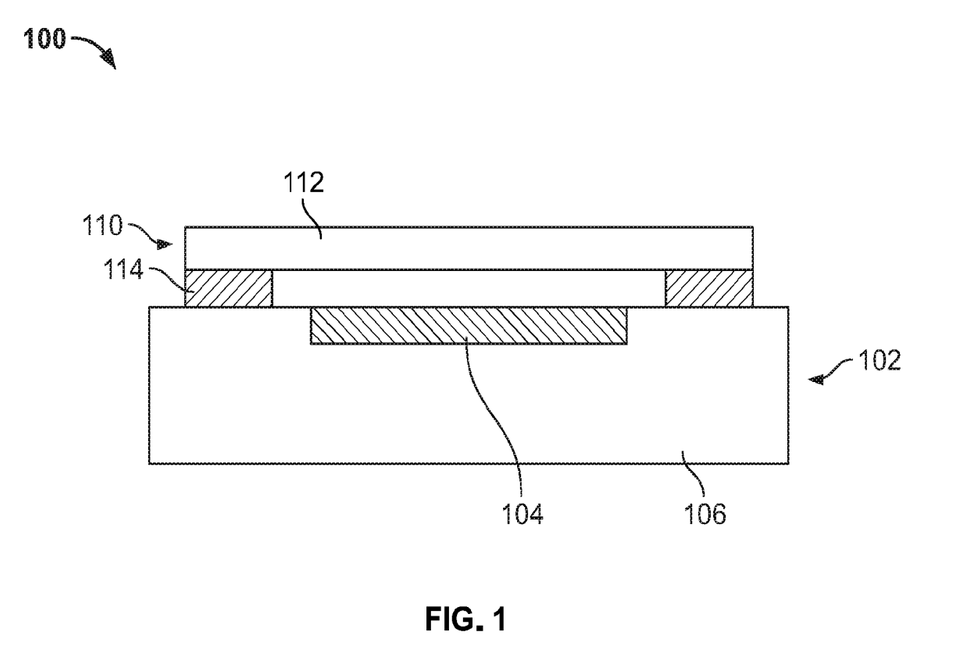
FIG. 1 shows a side cross-sectional view of an acoustic device assembly according to some embodiments of the present disclosure.

FIG. 1 shows an example of an assembly 100 of an acoustic protective cover 110 disposed over an acoustic device 102, in accordance with certain embodiments. As shown, the acoustic protective cover 110 includes a composite 112 and an adhesive layer 114, which secures the acoustic protective cover to an acoustic device 102 such as a speaker or receiver. The exemplary acoustic device 102 depicted in FIG. 1 can also include a device body 106 to which the adhesive layer 114 is attached, and a transducer 104.

Figure 2:
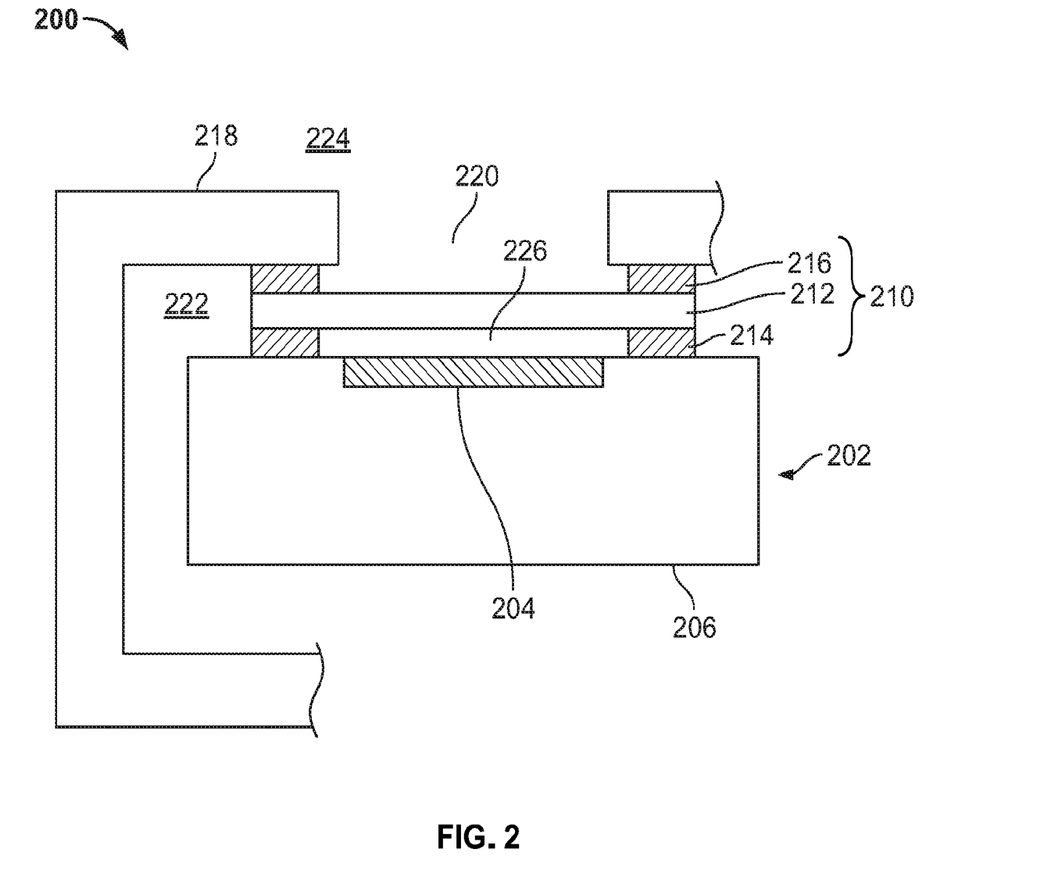
FIG. 2 shows an additional example of an acoustic device assembly in a side schematic view.

FIG. 2 shows a side schematic view of an exemplary acoustic device assembly 200 employing an acoustic protective cover 212 in conjunction with an acoustic device 202 according to certain embodiments. The acoustic device 202 may be a bell, speaker, microphone, buzzer, loudspeaker, or any similar acoustic device. The exemplary acoustic device 202 includes a device body 206 and a transducer 204 within the acoustic cavity 226. The acoustic cavity 226 is defined by the acoustic device 202 on one side, by the acoustic protective cover 212 on the other side, and by a first adhesive layer 214. The acoustic cavity 226 may also be aligned with a port 220 in a housing 218 that contains the acoustic device 202. In addition, the acoustic protective cover 212 can, in some embodiments, be connected to both the acoustic device 202 and the housing 218, e.g. by way of a second adhesive layer 216 between the acoustic protective cover and the housing. The first and second adhesive layers 214, 216 and the acoustic protective cover 212 can also form a layered assembly 210, which may be water resistant and/or waterproof. The acoustic protective cover 212 may also be configured to prevent water entry from an exterior space 224 into an interior space 222 of the housing 218 and/or into the acoustic cavity 226.

Test Methods

Laminar Volumetric Airflow ("LVA") Test: Laminar volumetric flow rates of air through the composites described herein were measured using an ATEQ Premier D Compact Flow Tester. In the ATEQ Premier D Compact Flow Tester, a flat sheet sample (square geometry with area 4-inch×4 inch) is clamped between two steel plates that contain orifices of 1 cm$^2$ circular area. A seal is formed around the sample by two O-rings in the equipment to eliminate any airflow leaks laterally through the sample. Once a seal is in place, the sample is challenged with 1 psi of air pressure through the bottom steel plate orifice. The flow tester will measure the airflow rate through the material (in liters/hour) through the 1 cm$^2$ orifice on the top steel plate.

Figure 3:
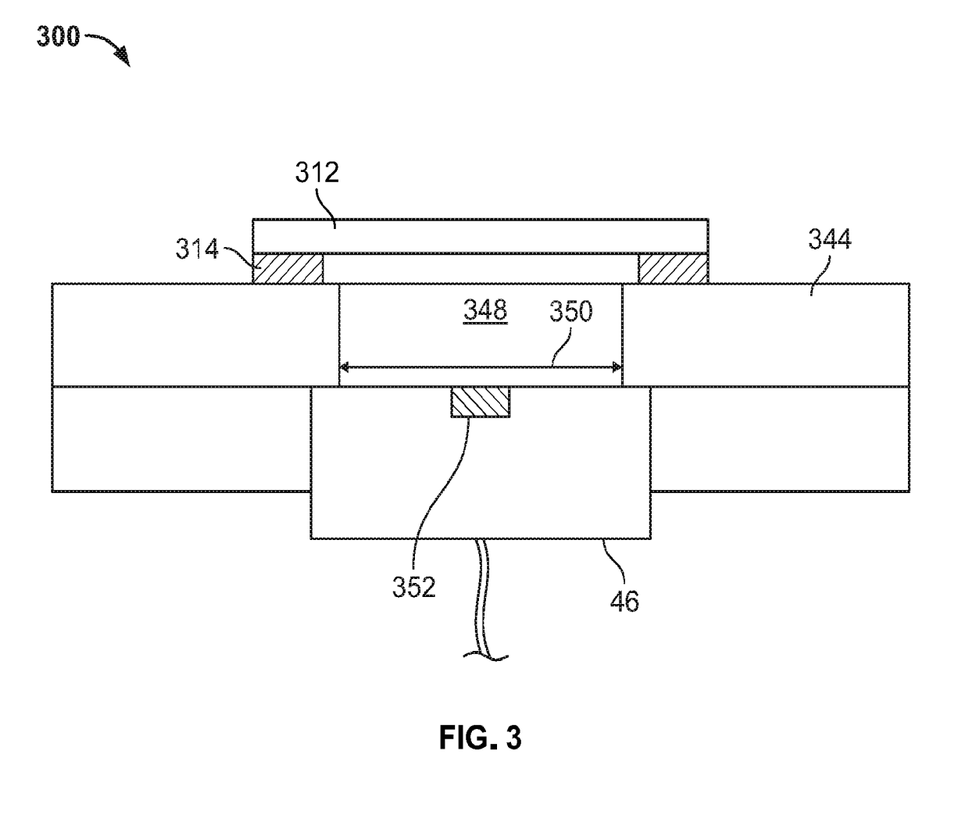
FIG. 3 shows an example of an Acoustic Response Measurement ("ARM") Test apparatus in a side cross-sectional view, according to some embodiments.

Acoustic Response Measurement ("ARM") Test: FIG. 3 is a schematic of the Acoustic Response Measurement test set up 300. The following method was used to measure the insertion loss of the acoustic cover test samples. The composite, 312, which includes an ePTFE membrane impregnated with a stiffening polymer, was die cut with an adhesive disc 314. The adhesive 314 used was a 0.05 mm thick acrylic double-coated adhesive tape. The geometry of the test sample was circular, with inner diameter of 1.6 mm and outer diameter of 3.3 mm. In FIG. 3, the total diameter of composite 312 shown is the 3.3 mm outer diameter, where the inner diameter is defined by the circular area of 312 within the center of the annular adhesive disc. The die cut test sample was then adhered to test plate 344 via adhesive 314. Plate 344 is a 1.2 mm thick aluminum plate of circular geometry containing an orifice 350 of 1 mm diameter. The test sample was adhered over the center of orifice 350. The plate 314 is attached to a fixture containing a microphone 46, which can be a micro-electro-mechanical-system ("MEMS") measurement microphone (e.g., the InvenSense INMP510 MEMS measurement microphone). Within the microphone assembly 46, a transducer element 352 transmits sound to an electrical signal. Assembly 300 is placed inside a Brüel & Kjær® type 4232 anechoic test box at a distance 6.4 cm from the anechoic box's internal driver or speaker (not shown). The speaker was excited to produce an external stimulus at 88 dB sound pressure level (SPL) over a frequency range from 100 Hz to 10 kHz. The acoustic response of the transducer 352 was measured under the following conditions: (a) with aperture 348 uncovered and (b) with the aperture 348 covered with the test sample. When the speaker is driven and programmed to perform the frequency sweep, the transducer response of the microphone across the aforementioned frequency range is recorded. The difference in the response in output SPL between conditions (a) and (b) is defined as acoustic insertion loss (the loss due to inserting the composite material between speaker and microphone).

Burst Testing: Burst testing relates to water intrusion through a material. The burst strength is defined as the pressure at which the composite mechanically yields and subsequently tears open. To measure burst strength, the test samples (1.6 mm inner diameter die cut samples) described above in the ARM test were affixed to a holder made of FR4, which contained a 1.6 mm diameter orifice. The holder with test sample was inserted into a metal fixture with top and bottom plate having 2 mm diameter orifices, and the top plate was clamped down with screws. The metal fixture was connected to a pressure vessel containing water. The pressure vessel was connected to a control box with programmable features that enable pressure ramp and pressure control of air up to a certain maximum pressure setting (e.g., 145 psi). The control box was programmed to ramp the incoming pressure at 0.5 psi per second ramp rate until a maximum pressure (e.g., 145 psi) was reached. If the composite failed at a pressure below 145 psi during the ramp phase, this pressure is noted as the burst strength of the composite. If the maximum pressure was reached without a mechanical failure (burst) of the composite, the pressure was held for a maximum of 10 minutes at the maximum pressure.

Stiffness: The viscoelastic properties of the composites were measured using small amplitude oscillatory strain (SAOS) on a Dynamic Mechanical Analyzer (DMA) made by TA Instruments (model RSA-G2). Rectangular-shaped specimen of the composites were prepared with a width of 13 mm and length of 40 mm. The DMA was accessorized with the Film Tension clamps to measure stiffness of the composites in tension. The clamps were preheated to the target temperature of the measurement, in this case 25° C., and also zero gap referenced at target temperature. A prepared specimen was mounted on the DMA clamps at a length of about 15 mm. The SAOS procedure used was an Oscillation Frequency Sweep. It consists of applying a small amplitude sinusoidal displacement and measuring the corresponding sinusoidal force. The frequency applied was 1 Hz. The stiffness of the specimen is calculated by dividing the maximum force in the sinusoidal response with the maximum displacement in the sinusoidal input at selected frequency.

$$\text{Stiffness} = \frac{\text{Force}}{\text{Displacement}}$$

The stiffness was measured in the machine direction ("MD") and the transverse direction ("TD"). The average of the MD stiffness and the TD stiffness resulted in the values for average stiffness provided herein.

Thickness: for precise determination of thickness, a Scanning Electron Microscopy (SEM) was used. Flat sheet samples were prepared and cut via a microtome technique. Then, the cross section of the material (through the thickness) was imaged under SEM to determine thickness.

Biaxial, out of plane Displacement Test ("BOD" Test): The biaxial, out of plane, displacement of the composites that results from stress of water pressure was determined using a single point laser test set up. To measure displacement of the composites, flat sheets of composites were inserted into a metal fixture with bottom plate having a 2 mm orifice and a top plate having a 1.6 mm orifice, where the top plate was clamped down with screws. The metal fixture was connected to a pressure vessel containing water. The pressure vessel was connected to a control box with programmable features that enable pressure ramp and pressure control of air. The control box was programmed to ramp the incoming pressure at 2.5 psi per second ramp rate until a maximum pressure of 29 psi was reached. This target pressure (e.g., 29 psi) represents a 20-meter water immersion depth rating that is an industry standard. The samples were held at the target pressure for a 10-minute duration. The single point laser is centered over the material during the protocol to assess out of plane displacement of the test sample.

EXAMPLES

Comparative Example 1

An expanded PTFE (ePTFE) membrane was made as per the teachings of U.S. Pat. No. 8,757,395. The ePTFE membrane had a mass per unit area of 2.3 gram/m$^2$, a thickness of 6.92 µm, and a laminar volumetric airflow (LVA) of 37 liters/hour/cm$^2$. The ePTFE membrane was tested for its acoustic performance using the ARM and BOD tests described herein. The acoustic insertion loss was 2.93 dB at a frequency of 1 kHz and the displacement was 0.33 mm. The burst strength and average stiffness of this ePTFE membrane were 107.8 psi and 4500 N/m, respectively.

Example 1

A continuous roll of an exemplary composite according to the present disclosure was prepared using the following procedure. In this case, the exemplary stiffening polymer was a fluorinated terpolymer. A 10 weight percent solution of 3M™ Dyneon™ Fluoroplastic Granules THV 221GZ (a terpolymer of TFE-VDF-HFP) in Methylethylketone (MEK) was prepared. Using a slot die with a gap opening of 0.003 inches (76.2 m), a wet film of the above solution was cast on a Polypropylene coated Polyethyleneterephthalate (PET) liner (part #PMP300CLR6 from Neptco, Lenoir, NC) and combined with the ePTFE membrane used in Comparative Example 1. The wet film was dried, thereby forming a composite. The drying procedure was as follows: The impregnated ePTFE membrane was run on the liner through a 10 foot (3 meter) long convection oven at a web speed of 10 feet per minute (3 meter/min). The oven temperature was set at 180° F. (82.2° C.).

The resulting composite containing 69.7 weight % THV221GZ polymer, was removed from the liner and tested for its properties which are listed in Table 1 below. The composite stiffness was 56% higher than that of comparative example 1 (i.e., the ePTFE membrane alone). The composite insertion loss was 6.29 dB at a frequency of 1 kHz and displacement was 25.2% less than that of the ePTFE membrane used. The burst strength of the composite was 127.9 psi.

Example 2

A composite using an exemplary stiffening polymer—Polycaprolactone—was made using the following procedure. 6 weight percent of Polycaprolactone pellets (SKU 440744, Sigma-Aldrich, Aldrich, St. Louis, MO) was dissolved in a solvent blend comprising of 70 parts MEK and 30 parts Dimethylacetamide (DMAc). Using a slot die with a gap opening of 0.003 inches (76.2 m), a wet film of the above solution was cast on a liner (part #PMP300CLR6 from Neptco) and combined with the ePTFE membrane used in Comparative Example 1 and dried by running the impregnated ePTFE membrane on the liner through 10 feet (3 meter) long convection oven at a web speed of 10 feet per minute (3 meter/min) at an oven temperature set at 350° F. (176.7° C.). The resulting composite containing 69.9 weight % Polycaprolactone, was removed from the liner and tested for properties, which are listed in Table 1. The composite stiffness was 67% higher than that of the ePTFE membrane alone (i.e., the ePTFE membrane of Comparative Example 1) and the insertion loss was 5.49 dB at a frequency of 1 kHz and displacement was 25.5% lower than that of the ePTFE membrane of Comparative Example 1. The composite did not burst at the maximum testable pressure of the test set-up used in the present Example. The maximum testable pressure of the test-set up was 145.0 psi, indicating that the burst strength of the composite of the present Example is greater than 145.0 psi. After achieving the maximum pressure of the equipment, the composite was held at the maximum pressure of 145.0 psi until the composite burst at a duration less than one minute.

Example 3

An exemplary composite according to the present disclosure was prepared with an exemplary stiffening polymer in the form of a thermoplastic polyurethane using the following procedure. First, a 5 weight percent of thermoplastic polyurethane pellets having of 75 Shore D hardness were dissolved (Pellethane™ 2363-75D from Lubrizol Advanced Materials, Incorporated, Brecksville, OH) in a solvent blend comprising 70 parts MEK and 30 parts Dimethylacetamide (DMAc) to form a solution. Using a slot die with a gap opening of 0.003 inches (76.2 m), a wet film of the above solution was cast on a liner (part #PMP300CLR6 from Neptco) and combined with the ePTFE membrane used in Comparative Example 1 and dried by running the impregnated ePTFE membrane on the liner through a 10 feet (3 meter) long convection oven at a web speed of 10 feet per minute (3 meter/min) and an oven temperature set at 350° F. (176.7° C.). The resulting exemplary composite, containing 68.1 weight % of polyurethane, was removed from the liner and tested for its properties which are listed in Table 1. The composite stiffness was 211% higher than that of the ePTFE membrane alone and the composite insertion loss was 6.3 dB at a frequency of 1 kHz and displacement was 27.6% lower than that of the ePTFE membrane. The composite did not burst instantaneously at the maximum testable pressure of the test set-up used in the present Example. The maximum testable pressure of the test-set up was 145.0 psi, indicating that the instantaneous burst strength of the composite of the present Example is greater than 145.0 psi. After achieving the maximum pressure of the equipment, the composite was held at the maximum pressure of 145.0 psi until the composite burst at a one-minute duration.

Example 4

A composite according to the present disclosure was prepared by the following procedure using a softer grade thermoplastic polyurethane than that of Example 3 (i.e., having a lower Shore hardness) was made using the following procedure. First, a 3.5 weight percent solution of 55 Shore D hardness thermoplastic polyurethane pellets (Tecothane™ TT-1055D from Lubrizol Advanced Materials Incorporated, Brecksville, OH) in Tetrahydrofuran (THF) was prepared. Using a slot die with a gap opening of 0.003 inches (76.2 m), a wet film of the above solution was cast on a liner (part #PMP300CLR6 from Neptco) and combined with the ePTFE membrane used in Comparative Example 1 and dried by running the impregnated ePTFE membrane on the liner through a 10 feet long (3 meter) convection oven at a web speed of 10 feet per minute (3 meter/min) and oven temperature set at 350° F. (176.7° C.). The resulting composite film, containing about 69.1 weight % polyurethane, was removed from the liner and tested for its properties which are listed in Table 1. The composite stiffness was 31% higher than that of the ePTFE membrane used, its insertion loss was 6.13 dB at a frequency of 1 kHz and displacement was 7.0% lower than that of the ePTFE membrane. The burst strength of the composite was 138.6 psi.

Comparative Example 2

A composite that includes a non-stiffening polymer was prepared, in accordance with the teachings of U.S. Pat. No. 10,110,981 as follows. A 6 weight percent solution of the non-stiffening polymer, Kraton™ D1124 (from Kraton Polymers, U.S LLC, Houston) was dissolved in Toluene. Using a slot die with a gap opening of 0.003 inches (76.2 m), a wet film of the above solution was cast on a siliconized PET liner (part C25 UVF28/F33 from MPI Release LLC, Winchester, MA) and combined with the ePTFE membrane used in Comparative Example 1 and dried by running the impregnated ePTFE membrane on the liner through a 10 feet (3 meter) long convection oven at a web speed of 10 feet per minute (3 meter/min) and an oven temperature set at 220° F. (104.4° C.). The composite, containing 63.5 weight % of Kraton polymer, was removed from the liner and tested for its properties which are listed in Table 1. The composite stiffness was 8% higher than that of the ePTFE membrane used, the composite insertion loss was 3.51 dB at a frequency of 1 kHz and displacement was 9.7% lower than that of the ePTFE membrane of Comparative Example 1. The burst strength of the composite was 133.0 psi.

Tables 1-3:

TABLE 1

|  | Impregnated Polymer | Composite Mass (g/m$^2$) | Wt. % Polymer Content (wt %) | Composite Thickness (μm) | LVA (L/hr/cm$^2$) |
|---|---|---|---|---|---|
| Comparative Example 1 | none | 2.3 | 0 | 6.92 | 37 |
| Example 1 | THV221GZ | 7.6 | 69.7% | 4.78 | 0 |
| Example 2 | Poly-caprolactone | 7.65 | 69.9% | 5.91 | 0 |
| Example 3 | Pellethane 2363-75D | 7.2 | 68.1% | 4.75 | 0 |
| Example 4 | Tecothane TT-1055D | 8.1 | 71.6% | 7.18 | 0 |
| Comparative Example 2 | Kraton D1124 | 6.3 | 63.5% | 5.35 | 0 |

TABLE 2

|  | Burst Strength (Psi) | Average Stiffness (N/m) | % Stiffness Increase | Insertion Loss at 1 kHz Frequency (dB***) |
|---|---|---|---|---|
| Comparative Example 1 | 107.8 | 4500 | — | 2.93 |
| Example 1 | 127.9 | 7000 | 55.6 | 6.29 |
| Example 2 | >145.0 | 7500 | 66.7 | 5.49 |
| Example 3 | >145.0 | 14000 | 211.1 | 6.3 |
| Example 4 | 138.6 | 5900 | 31.1 | 6.13 |
| Comparative Example 2 | 133.0 | 4850 | 7.8 | 3.51 |

***as per ARM test

TABLE 3

|  | Displacement mm | Displacement Decrease % |
|---|---|---|
| Comparative Example 1 | 0.330 | — |
| Example 1 | 0.247 | 25.2 |
| Example 2 | 0.246 | 25.5 |
| Example 3 | 0.239 | 27.6 |
| Example 4 | 0.307 | 7.0 |
| Comparative Example 2 | 0.298 | 9.7 |

Figure 4:
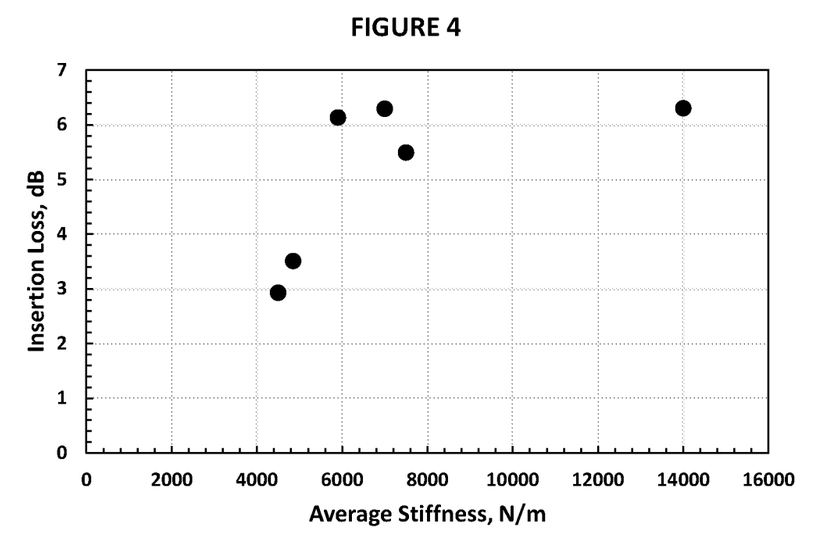
FIG. 4 depicts an exemplary relationship between insertion loss and average stiffness.
Figure 5:
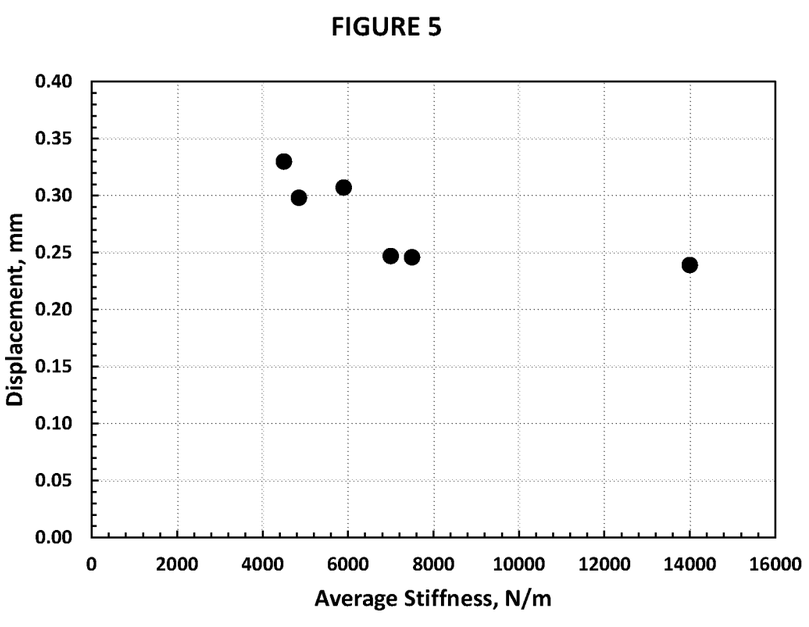
FIG. 5 depicts an exemplary relationship between average stiffness and displacement.

The results of the Examples described herein were plotted in FIGS. 4 and 5 and are shown in Tables 1-3 above. As described herein, supra, average stiffness is the average of MD stiffness and TD stiffness.

As shown in FIG. 4, there is a direct relationship between acoustic insertion loss and the stiffness of the air impermeable composite film of this invention. As stiffness increases, so does the acoustic insertion loss. Since the composite film stiffness is a function of both the thickness of the composite and the elastic modulus of the stiffening polymer, it is therefore important to balance these two characteristics to ensure that the insertion loss is maintained below the desired 7 dB level.

As shown in FIG. 5, an inverse relationship can exist between composite displacement and composite stiffness of the air impermeable composite film of this invention. As stiffness increases, displacement decreases. In some aspects, there may be a need to balance displacement with acoustic loss needs to identify an appropriate composite stiffness range.

Variations, modifications and alterations to the preferred embodiment of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

It is envisioned that any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of and "consisting of" may be replaced with either of the other two terms. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A composite comprising:
an expanded polytetrafluoroethylene (ePTFE) membrane having a porous microstructure;
    wherein the porous microstructure of the ePTFE membrane is fully impregnated with a stiffening polymer such that an average air flow of the composite is 0.0 liters/hour/cm$^2$ at 1.0 psi measured according to the Laminar Volumetric Airflow ("LVA") Test;
    wherein the stiffening polymer is a polymer that, when filling the porous microstructure of the ePTFE membrane in an amount ranging from 40 wt % to 85 wt % based on the total weight of the composite, increases the average stiffness of the composite by at least 20% compared to an average stiffness of the ePTFE membrane before impregnation with the stiffening polymer; and
wherein the composite exhibits an insertion loss of less than 7 dB at 1 KHz when measured by the Acoustic Response Measurement ("ARM") Test.

2. The composite of claim 1, wherein the composite has a thickness of 10 microns or less.

3. The composite of claim 1, wherein the composite exhibits a burst strength of greater than 125 psi.

4. The composite of claim 1, wherein the stiffening polymer comprises at least one of: tetrafluoroethylene-hexafluoropropylene-vinylidene fluoride copolymer, polycaprolactone, thermoplastic polyimide, thermoplastic polyurethanes, polysulfones, polyethersulfones, polystyrene, polyvinylidene fluoride, polycarbonates, polymethylmethacrylate, polyarylates, polybenzimidazoles, polyimides, epoxies, acrylates, or any combination thereof.

5. The composite of claim 1, wherein the stiffening polymer comprises at least one of: tetrafluoroethylene-hexafluoropropylene-vinylidene fluoride copolymer, polycaprolactone, thermoplastic polyurethanes, or any combination thereof.

6. The composite of claim 1, wherein the stiffening polymer does not comprise: styrene-butadiene-styrene block copolymers, styrene-isoprene-styrene block copolymers, tetrafluoroethylene/perfluoromethyl vinyl ether copolymers, silicone rubbers, styrenic block copolymers, thermoplastic copolyesters, and thermoplastic copolyamides, polyetherimides, silicones, fluorosilicones, fluoroelastomers, perfluoroelastomers, styrene-butadiene rubbers, ethylene diene propylene (EPDM) rubbers, nitrile rubbers, neoprene rubbers, or any combination thereof.

7. The composite of claim 1 wherein the composite is predominantly acoustically reactive and has a phase angle ("φ") between a real and an imaginary part of an acoustic impedance, such that the phase angle satisfies the following relations:

$$45° < \varphi \leq 90°; \text{ and} \qquad (I)$$

$$-90° \leq \varphi < -45°. \qquad (II)$$

8. The composite of claim 1, wherein the composite exhibits a decrease in displacement of from 5% to 50% compared to the ePTFE membrane before impregnation with the stiffening polymer, wherein the decrease in displacement is measured using the biaxial, out of plane displacement ("BOD") Test.

9. An acoustic device assembly comprising:
an acoustic device; and
a composite;
    wherein the composite comprises:
        an expanded polytetrafluoroethylene (ePTFE) membrane having a porous microstructure;
        wherein the porous microstructure of the ePTFE membrane is impregnated with a stiffening polymer such that an average air flow of the composite is 0.0 liters/hour/cm$^2$ at 1.0 psi measured according to the Laminar Volumetric Airflow ("LVA") Test;
        wherein the stiffening polymer is a polymer that, when impregnated in the porous microstructure of the ePTFE membrane in an amount ranging from 40 wt % to 85 wt % based on the total weight of the composite, increases the average stiffness of the composite by at least 20% compared to an average stiffness of the ePTFE membrane before impregnation with the stiffening polymer; and
    wherein the acoustic device assembly exhibits an insertion loss of less than 7 dB at 1 KHz when measured by the Acoustic Response Measurement ("ARM") Test.

10. The acoustic device assembly of claim 9, wherein the acoustic device is a speaker.

11. The acoustic device assembly of claim 9, wherein the acoustic device is a receiver.

12. The acoustic device of claim 10, wherein the acoustic device comprises an acoustic cavity and a transducer.

13. The acoustic device of claim 12, wherein the transducer is disposed within the acoustic cavity.

14. The acoustic device of claim 12, wherein the composite is disposed over the acoustic cavity.

15. The acoustic device assembly of claim 12, further comprising a housing, wherein the housing comprises an acoustic channel aligned with the acoustic cavity of the acoustic device.

16. The acoustic device of claim 15, further comprising an adhesive layer between the composite and the housing.

\* \* \* \* \*